(12) United States Patent
Loontjens et al.

(10) Patent No.: US 7,273,910 B2
(45) Date of Patent: Sep. 25, 2007

(54) PROCESS FOR THE PREPARATION OF A FUNCTIONALIZED POLYMER INTERMEDIATE PRODUCTS, COMPOSITIONS AND SHAPED PARTS

(75) Inventors: Jacobus Antonius Loontjens, Meerssen (NL); Bartholomeus Johannes Margretha Plum, Ulestraten (NL); Albert Arnold Van Geenen, Sittard (NL); Weihua Ming, Helmond (NL)

(73) Assignee: DSM IP Assets B.V., TE Heerlen (NL)

( * ) Notice: Subject to any disclaimer, the term of this patent is extended or adjusted under 35 U.S.C. 154(b) by 273 days.

(21) Appl. No.: 10/505,323

(22) PCT Filed: Feb. 20, 2003

(86) PCT No.: PCT/NL03/00132

§ 371 (c)(1),
(2), (4) Date: Mar. 10, 2005

(87) PCT Pub. No.: WO03/070785

PCT Pub. Date: Aug. 28, 2003

(65) Prior Publication Data

US 2005/0158560 A1 Jul. 21, 2005

(30) Foreign Application Priority Data

Feb. 21, 2002 (NL) .................................... 1020031

(51) Int. Cl.
C08F 283/00 (2006.01)
C08F 8/30 (2006.01)
C08G 63/00 (2006.01)
C08G 85/00 (2006.01)

(52) U.S. Cl. ...................... 525/424; 525/399; 525/400; 525/411; 525/408; 525/375; 525/124; 525/432; 525/437; 527/100; 252/54.3

(58) Field of Classification Search ................ 525/424, 525/420, 399, 400, 411, 408, 375, 124, 432, 525/437; 252/54.3; 527/100
See application file for complete search history.

(56) References Cited

U.S. PATENT DOCUMENTS

| 4,742,128 A | * | 5/1988 | Frisch et al. ................ 525/424 |
| 5,627,240 A | | 5/1997 | Furukawa |
| 6,228,980 B1 | | 5/2001 | Loontjens |

FOREIGN PATENT DOCUMENTS

| EP | 288 253 | | 10/1983 |
| EP | 377 259 | | 7/1990 |
| EP | 377259 A1 | * | 7/1990 |
| EP | 1 132 411 | | 9/2001 |
| EP | 1132411 A1 | * | 9/2001 |
| WO | 01/53383 | | 7/2001 |

* cited by examiner

*Primary Examiner*—Randy Gulakowski
*Assistant Examiner*—A. Toscano
(74) *Attorney, Agent, or Firm*—Nixon & Vanderhye P.C.

(57) ABSTRACT

Process for the preparation of a functionalized polymer containing an additive, in which process there is formed a compound that contains, besides at least one blocked isocyanate group, a free amino, hydroxy or carboxy group; this compound is linked to an additive via the free amino, hydroxy or carboxy group in the additive; this additive linked to the compound mentioned is contacted with a polymer that contains at least one free amino or hydroxyl group, at a temperature above the polymer's melting point and at least above 150° C., such that the blocked isocyanate group reacts with the free amino or hydroxy group of the polymer to form the functionalized polymer. The invention also relates to the intermediate products formed in the process and in the preparation thereof. Lastly, the invention relates to functionalized polymers and polymer compositions containing the functionalized polymer.

14 Claims, No Drawings

PROCESS FOR THE PREPARATION OF A FUNCTIONALIZED POLYMER INTERMEDIATE PRODUCTS, COMPOSITIONS AND SHAPED PARTS

CROSS REFERENCE TO RELATED APPLICATION

This application is the National Phase of International Application PCT/NL03/00132 filed Feb. 20, 2003 which designated the U.S., and was published in the English language.

The invention relates to a process for the preparation of a functionalised polymer. The invention also relates to intermediate products, processes for the preparation thereof, a functionalized polymer and a polymer composition containing a functionalized polymer as well as shaped parts.

A functionalized polymer may be prepared by adding an additive to a polymer. Certain properties of the polymer are improved in this way. A stabilizer, for example, is added in order to improve the stability of a polymer. Additives blended in polymers generally tend to migrate out of the polymer. This is also known as the "bleeding" of additives. An additive that bleeds out of a polymer accumulates on the surface of the polymer. This means not only the loss of a valuable additive from the polymer, but there also develops a deposit on the polymer surface. Such a deposit on the surface of a polymer is undesirable for many applications. Furthermore, the additive, while migrating out of the polymer, may cause deposits in polymer processing equipment. In injection moulding of polymers, for example, the additive may deposit in a mould. As a consequence, the injection moulding operation needs to be interrupted in order to clean the mould. Such interruptions of production processes are undesirable from a cost viewpoint.

Furthermore, additives may bleed out of coatings. Additives that are added to a coating composition or paint may migrate to the surface. As a result, the performance of the additive present on the surface may be lost, which is undesirable.

In a known method of preparing a functionalized polymer, the molecular weight of the additive is first increased and then the additive is blended in a polymer. This reduces the bleeding of additives out of polymers.

Another manner of preparing functionalized polymers is described by Wolfe in Rubber Chemistry and Technology (vol. 54, p. 988-995). Here, during the polymerization of segmented polyether ester elastomers, antioxidants are co-polymerized by utilizing bifunctional monomers with antioxidant properties, in this application also referred to as antioxidant. This prevents the antioxidant from bleeding out of the polymer. Dimethyl 5-(3,5-di-t-butyl4-hydroxybenzenepropanamido)-isophthalate, among other substances, is mentioned as a bifunctional antioxidant.

A drawback of this method as described by Wolfe is that it can only be applied during the polymerization of the polymer.

The invention aims to provide a process for the preparation of functionalized polymers that is not limited to the polymerization of the polymer and that prevents the additive from migrating.

This is achieved according to the invention in that
a. a first compound, containing at least one primary amino group and at least a group chosen from a first series comprising a secondary amino group, an amino group on a secondary carbon atom and a primary hydroxyl group or a group chosen from a second series comprising a hydroxyl group on a secondary carbon atom and a carboxy group, or a first compound containing at least one group chosen from the first series and also contains at least a group chosen from the second series whereby optionally said first or second series furthermore comprise a double or triple bond, is contacted with an amount of carbonylbislactam (CBL) at a temperature below 150° C. and with the amount of carbonyl bislactam being at least equimolar to the number of primary amino groups or at least equimolar to the number of groups chosen from the first series and with the molar amount of carbonyl bislactam being lower than the sum of the molar number of primary amino groups and groups chosen from the first or second series or lower than the sum of the molar number of groups chosen from the first series and chosen from the second series, as a result of which a first intermediate compound is formed which contains, besides at least one blocked isocyanate group, a free amino, hydroxy, carboxy group or a double or triple bond;

b. the first intermediate compound is contacted, at a temperature preferably below 150° C., with an additive such that a link is established via the free amino, hydroxy, carboxy group or the double or triple bond, resulting in the formation of a second intermediate compound;

c. the second intermediate compound is contacted with a polymer having at least one free amino group or hydroxyl group at a temperature above the melting point of the polymer and at least above 150° C., such that the blocked isocyanate group reacts with the free amino or hydroxy group of the polymer to form the functionalized polymer.

The invention provides a process for the preparation of functionalized polymers, which process is not limited to the polymerization of this polymer and prevents an additive from bleeding. Large amounts of polymer are usually continuously produced during polymerization. This means that when an additive is added during the polymerization of the polymer, large amounts of a functionalized polymer, comprising said additive, are produced. The process according to the invention allows smaller batches of functionalised polymer to be produced more easily in, for example, a compounding process. By adding an additive not during polymerization but later, for example during compounding in an extruder or during injection moulding in an injection moulding machine, greater flexibility is obtained than during the production of a polymer or a polymer composition. In addition, the continuous polymerization process is not disturbed in this manner.

In the process according to the invention a first reaction is carried out as mentioned under a. By way of an example of a first reaction, a reaction A) is shown below, in which a first compound, I, contains two primary amine groups and a secondary amine group and in which carbonylbiscaprolactam, CBC, is used as exemplary CBL. In reaction equation A), the first compound reacts with two moles of CBC to form the first intermediate compound, II, with two moles of caprolactam being split off.

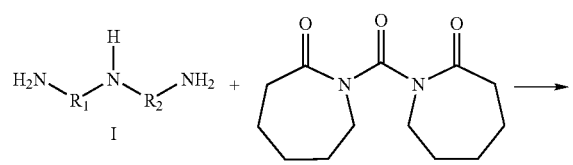

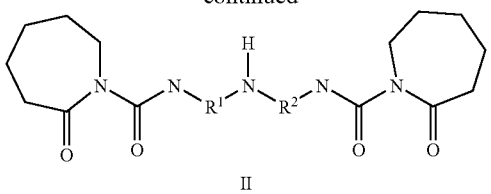

II

The reaction may be carried out 'in bulk', with the compound having the secondary amine, hydroxy or carboxy group and the CBL being contacted directly, but the reaction may also be carried out in solution.

A catalyst may optionally be applied in order to accelerate the reaction. Preferably a catalyst is applied for a reaction with a hydroxyl group. In that case the reaction is significantly accelerated. Suitable catalysts include acids, including Lewis acids, and bases, including Lewis bases.

Examples of acids, including Lewis acids, that are suitable as a catalyst are $LiX$, $Sb_2O_3$, $GeO_2$ en $As_2O_3$, $BX_3$, $MgX_2$, $BiX_3$, $SnX_4$, $SbX_5$, $FeX_3$, $GeX_4$, $GaX_3$, $HgX_2$, $ZnX_2$, $AlX_3$, $TiX_4$, $MnX_2$, $ZrX_4$, $R_4NX$, $R4PX$, $HX$, where $X=I$, Br, Cl, F, OR, acetylacetonate, or a compound according to formula (a)

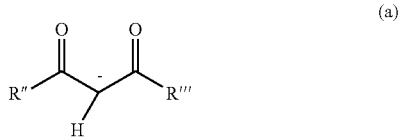

(a)

in which formula R'' and R''' are independently chosen from the series comprising alkyl, aryl, alkoxy and aryloxy. and R=alkyl or aryl. Brönstedt acids such as $H_2SO_4$, $HNO_3$, $HX'$ (where $X'=I$, Br, Cl, F), $H_3PO_4$, $H_3PO_3$, $RH_2PO_2$, $RH_2PO_3$, $R[(CO)OH]_n$, where $n=1-6$ are also suitable.

Examples of bases, including Lewis bases, that are suitable as a catalyst are $MH_n$, $M(OH)_n$, $(R'O)_nM$ ($M$=Alkali or earth alkali, $R'$=alkyl with $C_1$-$C_{20}$ or aryl), $NR'_nH_{4-n}OH$ ($R'$=alkyl with $C_1$-$C_{20}$ or aryl), triamines such as triethylamine, tributyl amine, trihexylamine, trioctylamine and cyclic amines such as diazobicyclo[2,2,2]octane (DABCO), dimethylaminopyridine (DMAP), guanidine, morfoline.

It is also possible to accelerate the reaction in the presence of another compound such as an acid scavenger.

If a solvent is used, preferrably an aprotic solvent is used. This prevents unwanted reactions with the solvent. Suitable aprotic solvents are for example aliphatic or aromatic hydrocarbons such as toluene or xylene.

The reaction of step a. of the invention is carried out at a temperature below 150° C. Undesirable side reactions may take place above 150° C., potentially resulting in a compound with less or no blocked isocyante anymore. The reaction is preferably carried out at a temperature below 125° C. If the boiling point of the chosen solvent is lower than the desired reaction temperature, the reaction may, if desired, be carried out under pressure and/or reflux. In general the reaction is carried out at a temperature above room temperature, preferably above 50° C. Long reaction times are prevented in this manner. A suitable first compound is one containing at least one primary amino group and at least a group chosen from a first series comprising a secondary amino group, an amino group on a secondary carbon atom, a primary hydroxyl group or a group chosen from a second series comprising a hydroxyl group on a secondary carbon atom and a carboxy group, or a first compound containing at least one group chosen from the first series and also at least one group chosen from the second series. The chosen groups may be mutually bonded by one or more aliphatic, cycloaliphatic or aromatic units chosen independently of one another.

Examples of suitable first compounds are for example bishexamethylenetriamine, bisethylenetriamine, bispropylenetriamine, 2-(ethylamino)ethylamine, 3-(methylamino)propylamine, 3-(cylohexylamino)propylamine, 1,2-propanediamine, N,N'-1,2-ethanediylbis-(1,3-propanediamine), N-(aminoethyl)benzylamine. Examples of a first compound containing amino and hydroxy groups are for example ethanolamine, propanolamine, isopropanolamine, 2-(2-aminoethyoxy)ethanol, N-(2-aminoethyl)ethanolamine, N-methylethanolamine, diethanolamine, chitin. Further examples of a first compound comprising a primary hydroxy group and a hydroxy group on a secondary carbon atom are glycerol, 1,2-pentanediol,1,2,4-butanetriol or glucose. Examples of first compounds containing amino and carboxy groups are glycine, asparagine, lysine, glutamine or γ-aminocapronic acid.

Various types may be used as CBL. Preferably carbonylbiscaprolactam, CBC, is used because of its commercial availability.

In the reaction of the invention referred to under b., the first intermediate compound is contacted, preferably at a temperature below 150° C., with an additive such that a link is established via the free amino, hydroxy or carboxy group or via a double or triple bond to form a second intermediate compound. The additive's linkage to the first intermediate compound takes place via a reactive group that is present on the additive. An example of this link is shown in the reaction equation B) below, which is based on the reaction product of reaction A) and wherein YFn symbolizes the additive containing a reactive group Y. If the first intermediate compound contains several reactive groups per molecule, then several molecules of the additive per molecule of the first intermediate compound may be linked.

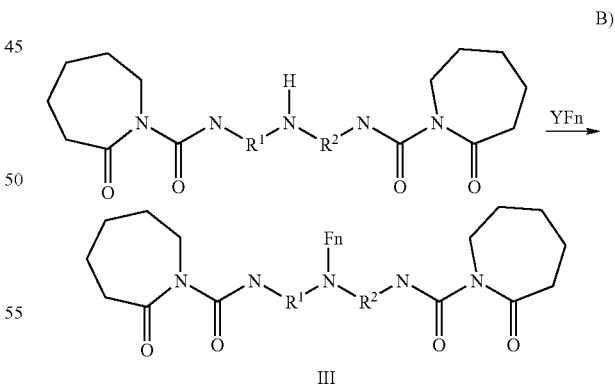

B)

III

The linkage may take place if the additive contains a reactive group Y capable of reacting directly with a group of the first intermediate compound. Reactive groups on the additive may be an amino, hydroxyl or carboxy group, or a halide, an ester, an isocyanate, an epoxy, an aldehyde or an anhydride. In some cases the linkage cannot take place directly, for example because both the first intermediate compound and the additive contain groups that do not react directly with one another, for example when both contain a hydroxyl, amino or carboxy group. In such cases the linkage may take place via a so-called linking unit. This linking unit contains one reactive group capable of reacting with the reactive group of the first intermediate compound and one reactive group capable of reacting with the reactive group present in the additive. If the linking unit is to link with a hydroxyl group, the linking unit preferably contains an acid group, an isocyanate, a dihalogenide or a cyclic anhydride. If the linking unit is to link with an amino group, it preferably contains an acid group, an isocyanate, an aldehyde or a cyclic anhydride, or carbonylbislactam. In using this latter compound the reaction has to be carried out at a temperature above 150° C. If the linking unit is to link with a carboxy group, it preferably contains an amino group or hydroxy group. Suitable linking units may be cyclic anhydrides, diisocyanates or aldehydes.

Examples of cyclic anhydrides are for example succinic anhydride, maleic anhydride or phthalic anhydride. A diisocyanate that may be suitable is for example isoferondiisocyanate (IPDI) or toluenediisocyanate (TDI). Examples of aldehydes are for example formaldehyde, acetaldehyde, benzaldehyde or glyoxal. If a linking unit is used, it is preferably first reacted with the first intermediate compound or the additive and the formed product is subsequently, in a next reaction step, reacted with the additive or the first intermediate compound respectively.

An additive in this invention is understood to be an antioxidant, a flame retardant, a bactericide, a fungicide, a dying agent, a surfactant, an anti-fouling agent, a colouring agent, an antistatic agent or a lubricant, or a combination thereof.

The reaction is preferably carried out at a temperature below 150° C., because otherwise undesirable side reactions may take place. In general the reaction is carried out at a temperature above room temperature, preferably above 50° C. Long reaction times are prevented in this manner.

In the reaction referred to under c. above, the second intermediate compound is contacted with a polymer having at least one free amino group or hydroxyl group such that the blocked isocyanate group of the second intermediate compound reacts with the free amino group or hydroxy group of the polymer. In the process according to the invention the second intermediate compound is preferably added to the polymer in an extruder or injection moulding machine. In this manner, the second intermediate compound is rapidly blended with the polymer and a quick reaction takes place at the high temperatures during extrusion or injection moulding. Under these conditions the reaction will usually be complete in a few minutes. The second intermediate compound may also be added during the production of coating compositions. The second intermediate compound may be metered directly to the extruder or may be added to the extruder or injection moulding machine pre-blended with the polymer or other additives. If the second intermediate compound is liquid, it may also be added to the extruder or injection moulding machine with a liquid metering system. It is also possible to add additives that react with acid groups, if present, such as phenylenebisoxazoline, phenylenebisoxazine, (di)epoxides and carbodiimides. During the reaction of the blocked isocyanate group of the second intermediate compound with a free amino or hydroxy group of the polymer caprolactam is split off, which caprolactam may be removed from the extruder or injection moulding machine or polymer through devolatization.

If the second intermediate compound contains one blocked isocyanate group, the second intermediate compound may be linked to the end of the polymer chain. If the second intermediate compound contains several blocked isocyanate groups, it may also be incorporated in the polymer. If the second intermediate compound links two polymer chains, chain extension may occur. This is manifested by an increase in the molar mass of the polymer. An extra advantage of the invention is that additives having only one functional group may also be used. In the publication by Wolfe cited above this is not possible since the addition of a monofunctional compound during the polymerization may result in chain termination, as a result of which the polymer's molecular mass is limited. Also, the addition, via the process of the invention, of the additives cited by Wolfe will not result in a functionalized polymer in which additives do not bleed, since in general the additives cited by Wolfe react only slowly. Consequently, over the relatively short reaction time in an extruder, practically no reaction takes place with the polymer, so allowing the additives still to bleed out of the polymer.

The second intermediate compound is contacted with the polymer containing at least one free amino or hydroxy group at a temperature above the melting point of the polymer and at least at 150° C. At lower temperatures the reaction will proceed more slowly and will not run to completion during the residence time in the extruder. The upper temperature limit is not subject to any further limitation than the temperature customary for melt processing of the polymers in question.

Polymers that contain a free amino or hydroxy group are for example polyamides, polyesters, copolyesters, polyethers, polyacrylates, cellulose and amine or hydroxy functionalized polymers or copolymers or blends thereof.

Exemplary polyamides are polyamides and copolyamides that are derived from diamines and dicarboxylic acids and/or from aminocarboxylic acids or the corresponding lactams, such as polyamide 4, polyamide 6, polyamide 11, polyamide 12, polyamide 6/6, 4/6, partially aromatic (co)polyamides, for example polyamides based on an aromatic diamine and adipic acid; polyamides produced from an alkylenediamine and isophthalic and/or terephthalic acid and copolyamides thereof.

Exemplary polyesters are polyesters derived from dicarboxylic acids as e.g terephthalic acid, isophthalic acid and trimellitic acid, and dialcohols as e.g. ethylene glycol, propane diol, butanediol, neopentyl glycol and/or from hydroxycarboxylic acids or the corresponding lactones including polyethyleneterephthalate, polypropyleneterephthalate, polybutyleneterephthalate, poly-1,4-dimethylolcyclohexaneterephthalate, polycaprolacton and copolyesters thereof or thermosetting polyesters derived of any one of the above mentioned monomers.

Exemplary polyethers are polytetrahydrofuran, polypropyleneglycol, polyethyleneglycol and polyoxymethylene and copolyethers thereof or copolymers containing the abovementioned polyesters, in particular copolyesters including Arnitel®.

Examples of amine functionalized polymers are for example amine functionalized polyethers including Jeffamines and amino terminated acrylonitrilebutadiene copolymers (ATBN).

An exemplary hydroxy functionalized polymer is for example hydroxyfunctional polybutadiene.

The amount of the second intermediate compound to be added to the polymer may be freely chosen. Preferably the amount of the additive is chosen to be equal to or lower than the amount of free amino or hydroxy groups. These groups may be determined by techniques known to those skilled in the art. In general, a polymer with a lower molar mass contains more free amino or of hydroxy groups so that a larger amount of the second intermediate compound may be linked to a polymer with a lower molar mass. The amount of the second intermediate compound is preferably so chosen that the amount of additive to be introduced in the polymer is equal to the desired dosage of the additive in the polymer composition. If a larger amount of additive is to be added to the polymer via the second intermediate compound than the available terminal groups in this polymer, this may be accomplished by using a second intermediate compound to each molecule of which more than one molecule of the additive is linked.

If desired, fillers may be added during compounding. In general, there may be added glass fibres, glass spheres, glass lamellae, mineral fillers including for example, mica, talcum, chalk or gypsum, rubbers, including for example halogenated polymer systems and synergists such as antimonetrioxide, sodiumantimonate or zinc borate.

The invention also relates to a first intermediate compound comprising at least one blocked isocyanate group and a free amino, hydroxy or carboxy group.

The invention further relates to a second intermediate compound comprising an additive that is linked to a compound containing at least one blocked isocyanate group. In this second intermediate compound the additive may be linked to the first intermediate compound via the free amino, hydroxy or carboxy group or via a double or triple bond present in the first intermediate compound.

Furthermore, the invention relates to a process for obtaining the said intermediate compounds and product. It concerns a process for the preparation of the first intermediate compound, wherein the process comprises step a. of the process of the invention. In this process the additive is chosen from the series of stabilizers, flame retardants, bactericides, fungicides, dying agents, surfactants, anti-fouling agents, colouring agents, antistatic agents and lubricants.

The invention further relates to a process for the preparation of the second intermediate compound wherein the process comprises steps mentioned under a. and b. of the process of the invention. The invention further relates to an alternative route to produce a functionalised polymer using an additive comprising a lactam blocked isocyanate groups. Such process comprises a. reacting an additive comprising at least one amino group or a hydroxyl group with carbonylbislactam at a temperature below 150° C. such that a link is established via the amino group or hydroxyl group of the additive, thereby forming an intermediate product A, b. contacting the intermediate product A with a polymer having at least one free amino group or hydroxyl group at a temperature above the melting point of the polymer and at least above 150° C., such that the blocked isocyanate group reacts with the free amino group or hydroxy group of the polymer to form a functionalized polymer.

In this process an intermediate product A is formed. The invention therefore also relates to an intermediate product A comprising an additive provided with a lactam blocked isocyanate group as well as the process for the preparation of an intermediate product A, which comprises step a. of the above mentioned alternative process according to the invention.

In the case of intermediate product A which contains only one blocked isocyanate, an additive comprising an amino group or a hydroxyl group is reacted with CBL at a temperature preferably below 150° C., with said additive such that a link is established via the amino group or hydroxyl group of the additive.

The invention also provides a functionalised polymer obtainable by the process of the invention.

Such a functionalized polymer may also be added to other polymers, this group of other polymers not necessarily being limited to the group of polymers that contain a free amino or hydroxy group. The invention therefore also provides polymer compositions containing also a functionalized polymer with an additive that does not bleed.

Said functionalized polymers or polymer compositions according to the invention can also be applied in coating compositions. The invention therefore also provides a coating composition comprising functionalized polymers according to the invention or shaped articles comprising a functionalised polymer composition according to the invention The coating composition can further comprise the usual fillers applied in coating chemistry.

Upon curing of the coating composition according to the invention a coating is obtained on a substrate. The invention therefore furthermore provides substrates comprising a coating based on the coating composition according to the invention.

Furthermore the invention relates to shaped articles comprising functionalized polymers according to the invention or shaped articles comprising functionalised polymer compositions according to the invention. The shaped articles can be produced by the known methods as e.g. injection moulding or extrusion. Consequently shaped articles comprise moulded parts extruded parts, films, strapping and fibres.

The invention is elucidated by the following non-limiting examples.

EXAMPLE I

Preparation of a First Intermediate Compound Containing an Amino Group and Two Blocked Isocyanate Groups 10.3 g (0.1 mol) of bisethylenetriamine and 50.4 g (0.2 mol) of carbonylbiscaprolactam (CBC) are dissolved in 100 ml of toluene. The solution is heated to 70° C. for 1 hour. After the mixture has cooled down to room temperature, caprolactam liberated in the reaction is extracted twice with 50 ml of water. The product, the caprolactam blocked diisocyanate of bisethylenetriamine, has formed virtually quantitatively and can be isolated by distilling off toluene.

EXAMPLE II

Preparation of a First Intermediate Compound Containing an Amino Group and Two Blocked Isocyanate Groups 21.5 g (0.1 mol) of bishexamethylenetriamine and 50.4 g (0.2 mol) of carbonylbiscaprolactam (CBC) are dissolved in 100 ml of toluene. The solution is heated to 70° C. for 1 hour. After the mixture has cooled down to room temperature, caprolactam liberated in the reaction is extracted twice with 50 ml of water. The product, the caprolactam blocked diisocyanate of bishexamethylenetriamine, has formed virtually quantitatively and can be isolated by distilling off toluene.

EXAMPLE III

Preparation of an Intermediate Product A Containing an Amino Group and One Blocked Isocyanate Ground 15.0 g (0.1 mol) of (2-aminoethyl) benzylamine and 25.2 g (0.1 mol) of carbonylbiscaprolactam (CBC) are dissolved in 100 ml of toluene. The solution is heated to 70° C. for 1 hour. After the mixture has cooled down to room temperature, caprolactam liberated in the reaction is extracted twice with 50 ml of water. The product, the caprolactam blocked mono-isocyanate of (2-aminoethyl) benzylamine, has formed virtually quantitatively and can be isolated by distilling off toluene.

EXAMPLE IV

Preparation of an Intermediate Product A Containing an Amino Group and One Blocked Isocyanate Group 16.8 g (0.1 mol) of 1,1-dimethyl, 3,3-dimethyl, 5-aminopiperidine and 25.2 g (0.1 mol) of carbonylbiscaprolactam (CBC) are dissolved in 100 ml of toluene. The solution is heated to 70° C. for 1 hour. After the mixture has cooled down to room temperature, caprolactam liberated in the reaction is extracted twice with 50 ml of water. The product, the caprolactam blocked mono-isocyanate of 1,1-dimetyl, 3,3-dimethyl, 5-aminopiperidine, has formed virtually quantitatively and can be isolated by distilling off toluene

EXAMPLE V

Preparation of a Second Intermediate Compound that Contains the Additive Dimethylphosphite Linked to the Fist Intermediate Compound in Example I via a Formaldehyde Linking Unit 91.9 g (0.25 mol) of caprolactam blocked diisocyanate of bisethylenetriamine (obtained in Example I), 7.5 g of formaldehyde (0.25 mol) as a linking unit and 100 ml of methanol are heated to 60° C. for 1 hour. In a second step 27.5 g (0.25 mol) of the additive dimethylphosphite are added in the presence of 0.5 g of NaOH as a catalyst. After two hours the excess of methanol is distilled off and the product is washed once with 50 ml of water. The product is a phosphorus modified caprolactam blocked diisocyanate of bisethylenetriamine, that cab be used to prepare a flame retardant polymer that dos not bleed.

EXAMPLE VI

Preparation of a Second Intermediate Compound that Contains an Additive, the Acid Chloride of Perfluorododecanoic Carboxylic Acid, Linked to the First Intermediate of Example I via an Amino Group 91.9 g (0.25 mol) of caprolactam blocked diisocyanate of bisethylenetriamine (see Example I) and 25 g (0.25 mol) of triethylamine (as acid scavenger) are dissolved in 400 ml of toluene. A solution of 158 g (0.25 mol) of the additive, the acid chloride of perfluordodecanoic carboxylic acid, in 200 ml of toluene, is added at room temperature. After that, the solution is heated to 40° C. for 2 hours. Next, the formed triethylamine HCl salt is filtered off and the filtrate is concentrated by evaporation. The product is the amide of perfluorododecanoic carboxylic acid and the caprolactam blocked diisocyanate of bisethylenetriamine, which can be used to form a functionalised polymer with a built in fouling agent.

EXAMPLE VII

Preparation of a Functionalized Polymer

A mixture of 5 wt % of the phosphorus modified caprolactam blocked diisocyanate of bisethylenetriamine as obtained in Example V and 95 wt % of nylon-6 are added to the hopper of an extruder. The extruder temperature is adjusted to 260° C. and the residence time is approx. 2 minutes. The strands of the polymer composition thus obtained are chopped to form a granulate. The granulate is processed in an injection moulding machine at 260° C. and a mould temperature of 85° C. into test bars of 3*6*75 mm and tested in terms of flame retardance through LOI, limiting oxygen index. The LOI of the test bars was measured to ASTM D2863 and amounted to 26. This is substantially higher than that of test bars obtained without the compound in Example V, where the LOI amounted to 21. While injection moulding 500 test bars, the mould did not exhibit any deposit from the phosphorus compound bleeding out of the polymer.

EXAMPLE VIII

Preparation of an Intermediate Product A Comprising One Caprolactam Blocked Isocyanate Group and a Fluorine Containing Additive A commercially available per-fluorine alkyl alcohol (see reaction below, n=7) was reacted with carbonyl biscaprolactam in equimolar amounts in the presence of $MgBr_2$ as catalyst for two hours at 125° C., according to the reaction below.

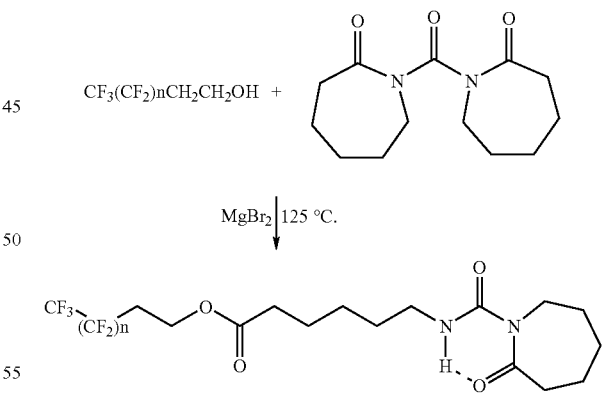

EXAMPLE IX

Preparation of Coating Comprising the Additive of Example VIII on a Substrate

A coating composition was made by blending a hydroxy functional polyester resin according to the following formula

in which n=4 and m=1, the per-fluorine alkyl blocked isocyanate of example VIII, and a tri-functional blocked isocyanate Desmodur® BL-3272 (Bayer). The overall OH/NCO molar ratio was maintained slightly higher than 1. The ratio of per-fluorine alkyl blocked isocyanate to BL-3272 was chosen such that the fluorine content was 3% by weight of the film. The coating composition was applied on clean aluminum panels in such an amount as to obtain a coating thickness of about 20 μm and then cured at 200° C. for 0.5 hour. The thickness of the cured coating on the aluminium substrate was found to be 20 μm, as measured using a Twin-Check thickness gauge by List-Magnetic GmbH. Contact angles were measured with deionized water and hexadexane (>99%, Merck) on a contact angle microscope (G10, Krüss, Hamburg-Germany) and amounted to 80° and 125° with hexadexane and water, respectively. From these contact angles surface energy of the coating was calculated according to methods known to the skilled man. This surface energy of the coating was 9 mN/m, which is significantly lower that the surface energy of 40 mN/m measured at the same coating not comprising the intermediate product A of Example VIII. The fact that the surface energy of the coating was very low can also be seen by comparing with the value for Teflon, which was measured to be 20 mN/m. The coating according to the invention therefore has a lower surface energy than Teflon which is well known for its low surface energy. Due to the low surface energy of the coating of 9 mN/m, the coating showed very good anti fouling and non staining properties.

Furthermore extraction tests were done with aceton to verify whether the intermediate product A of Example VIII could be removed from the coating. It was not possible to remove the intermediate product A of example VIII from the coating through the aceton treatment. Thus the intermediate product A of example VIII is chemically fixed at the coating.

EXAMPLE X

Preparation of Functionalised Polymer Comprising the Intermediate Product A of Example IV The additive as obtained through Example IV was fed to a twinscrew extruder of diameter 30 mm together with polyamide 6, (PA6). The amount of the intermediate product A of Example IV was 0.7% by weight of the amount of polyamide 6. The temperature of the extruder barrel was set to 265° C. and a functionalized polymer was obtained upon meltmixing the PA6 with the intermediate product A of Example IV. After leaving the extruder, the functionalized polymer was cut into pellets and dried to a moisture amount of less than 0.05 w %.

Of the dried polymer fibers were spun and compared with that of a polyamide 6, not comprising the intermediate product A according to Example IV. It was seen that the melt degradation of the polymer obtained according to Example X, upon melt processing, was less than that of a polyamide 6, not comprising the intermediate product A according to Example IV. Dyability of the fibres of both the polyamide 6 with or without the intermediate product A of Example IV were comparable.

The invention claimed is:

1. Process for the preparation of a functionalized polymer wherein
    a. a first compound, containing at least a primary amino group and at least a group chosen from a first series comprising a secondary amino group, an amino group attached to a secondary carbon atom and a primary hydroxyl group or a group chosen from a second series comprising a hydroxyl group attached to a secondary carbon atom and a carboxy group, or a first compound containing at least a group chosen from the first series and also contains at least a group chosen from the second series whereby optionally said first or second series furthermore comprise a double or triple bond, is contacted with an amount of carbonyl bislactam at a temperature below 150° C. and with the amount of carbonyl bislactam being at least equimolar to the number of primary amino groups or at least equimolar to the number of groups chosen from the first series and with the molar amount of carbonyl bislactam being lower than the sum of the molar number of primary amino groups and groups chosen from the first or second series or lower than the sum of the molar number of groups chosen from the first series and chosen from the second series, as a result of which a first intermediate compound is formed which contains, besides at least one blocked isocyanate group, a free amino group, hydroxy group, carboxy group or a double or triple bond;
    b. the first intermediate compound is contacted, at a temperature preferably below 150° C., with an additive such that a link is established via the free amino, hydroxy or carboxy group or via a double or triple bond to form a second intermediate compound;
    c. the second intermediate compound is contacted with a polymer having at least one free amino group or hydroxyl group at a temperature above the melting point of the polymer and at least above 150° C., such that the blocked isocyanate group reacts with the free amino group or hydroxy group of the polymer to form the functionalized polymer.

2. Process according to claim 1 wherein the carbonylbislactam is carbonylbiscaprolactam.

3. Process according to claim 1 wherein the polymer is chosen from the series of polyamides, polyesters, copolyesters, polyethers, polyacrylates, cellulose and hydroxy or amino functionalized polymers.

4. Process for the preparation of an intermediate compound comprising at least one blocked isocyanate group and a free amino, hydroxyl or carboxy group, or a double or triple bond, wherein:
    a. a first compound, containing at least a primary amino group and at least a group chosen from a first series comprising a secondary amino group, an amino group attached to a secondary carbon atom and a primary hydroxyl group or a group chosen from a second series comprising a hydroxyl group attached to a secondary carbon atom and a carboxy group, or a first compound containing at least a group chosen from the first series and also contains at least a group chosen from the second series whereby optionally said first or second series furthermore comprise a double or triple bond, is contacted with an amount of carbonyl bislactam at a temperature below 150° C. and with the amount of carbonyl bislactam being at least equimolar to the number of primary amino groups or at least equimolar to the number of groups chosen from the first series and with the molar amount of carbonyl bislactam being lower than the sum of the molar number of primary amino groups and groups chosen from the first or second series or lower than the sum of the molar number of groups chosen from the first series and chosen from the second series, as a result of which a first intermediate compound is formed which contains, besides at least one blocked isocyanate group, a free amino group, hydroxy group, carboxy group or a double or triple bond;

b. the first intermediate compound is contacted, at a temperature preferably below 150° C., with an additive such that a link is established via the free amino, hydroxy or carboxy group or via a double or triple bond to form a second intermediate compound.

5. Process for the preparation of a second intermediate compound comprising an additive that is linked to a first intermediate compound comprising at least one blocked isocyanate group via a free amino, hydroxyl or carboxy group, or a double or triple bond present in the first intermediate compound, wherein:

a. a first compound, containing at least a primary amino group and at least a group chosen from a first series comprising a secondary amino group, an amino group attached to a secondary carbon atom and a primary hydroxyl group or a group chosen from a second series comprising a hydroxyl group attached to a secondary carbon atom and a carboxy group, or a first compound containing at least a group chosen from the first series and also contains at least a group chosen from the second series whereby optionally said first or second series furthermore comprise a double or triple bond, is contacted with an amount of carbonyl bislactam at a temperature below 150° C. and with the amount of carbonyl bislactam being at least equimolar to the number of primary amino groups or at least equimolar to the number of groups chosen from the first series and with the molar amount of carbonyl bislactam being lower than the sum of the molar number of primary amino groups and groups chosen from the first or second series or lower than the sum of the molar number of groups chosen from the first series and chosen from the second series, as a result of which a first intermediate compound is formed which contains, besides at least one blocked isocyanate group, a free amino group, hydroxy group, carboxy group or a double or triple bond.

6. Process for the preparation of a functionalized polymer by a. reacting an additive comprising at least one amino group or a hydroxyl group with carbonylbislactam at a temperature below 150° C. such that a link is established via the amino group or hydroxyl group of the additive, thereby forming an intermediate product A, b. contacting the intermediate product A with a polymer having at least one free amino group or hydroxyl group at a temperature above the melting point of the polymer and at least above 150° C., such that the blocked isocyanate group reacts with the free amino group or hydroxy group of the polymer to form a functionalized polymer.

7. Process for the preparation of an intermediate product A comprising an additive provided with a lactam blocked isocyanate group, wherein:

a. reacting an additive comprising at least one amino group or a hydroxyl group with carbonylbislactam at a temperature below 150° C. such that a link is established via the amino group or hydroxyl group of the additive, thereby forming an intermediate product A.

8. Functionalized polymer obtainable according to the process of claim 1.

9. Polymer composition containing a functionalized polymer according to claim 8.

10. Shaped article comprising the polymer composition of claim 9.

11. Shaped article according to claim 10 wherein the shaped article is a film, fibre, monofilament or strapping.

12. Coating composition comprising a second intermediate compound which comprises an additive that is linked to a first intermediate compound wherein the first intermediate compound comprises at least one blocked isocyanate group and a free amino, hydroxyl or carboxy group, or a double or triple bond and wherein the additive that is linked to the first intermediate compound via the free amino, hydroxyl or carboxy group, or a double or triple bond Present in the first intermediate compound.

13. Coating composition according to claim 12, wherein the additive is chosen from the series of stabilizers, flame retardants, bactericides, fungicides, surfactants, anti-fouling agents, coloring agents, antistatic agents and lubricants.

14. Substrate comprising a coating based on the coating composition according to claim 12 or 13.

* * * * *